3,232,973
1,2-DI(ISOCYANATOMETHYL)CYCLOBUTANE
Otto Bayer, Rudolf Schröter, Werner Siefken, and Kuno Wagner, all of Leverkusen, Germany, assignors to Farbenfabriken Bayer Aktiengesellschaft, Leverkusen, Germany, a German corporation
No Drawing. Filed Sept. 22, 1960, Ser. No. 57,622
Claims priority, application Germany, Sept. 22, 1959, F 29,433
1 Claim. (Cl. 260—453)

This invention relates to new organic polyisocyanates, processes for the preparation thereof and improved polyurethane plastics obtained therefrom.

It has been proposed heretofore to prepare organic polyisocyanates by the phosgenation of amines and to use the resulting isocyanates for the production of cross-linked plastics by reaction thereof with active hydrogen containing compounds. Both porous and nonporous plastics are prepared by the process and they may be elastic materials, substantially rigid or elastic cellular plastics, lacquers, films, foils, adhesives, textile coatings, castings and the like. Processes for using polyisocyanates are disclosed in Zeitschrift für Angewandte Chemie 59 (1948), page 257 and 62 (1950) pages 57 to 66 and Kunststoffe 40 (1950), pages 3 to 14.

In many cases it is desirable to prepare lacquers, films, textile coatings, foils and the like which are almost constantly exposed to light. Aromatic polyisocyanates when reacted with active hydrogen containing compounds yield plastics which are often severely yellowed on exposure to light unless protected. Less yellowing is experienced when using aliphatic or hydroaromatic polyisocyanates such as 1,6-hexamethylene diisocyanate and the like. However, these organic polyisocyanates react slowly with reactive hydrogen and have adverse physiological properties. Moreover, the mechanical properties of lacquers, for example, obtained therefrom are less satisfactory than lacquers obtained from aromatic polyisocyanates.

It is, therefore, an object of this invention to provide organic polyisocyanates which will yield substantially light-fast polyurethane plastics. Another object of this invention is to provide a process for the preparation of new organic polyisocyanates. Still a further object of this invention is to provide improved polyurethane plastics based on said organic polyisocyanates. Another object of this invention is to provide a process for the preparation of polyurethane lacquers, films, foils and the like. Another object of this invention is to provide coating compositions and substrates coated therewith which are substantially insensitive to the action of light. A further object of this invention is to provide isocyanate-modified active hydrogen containing compounds which are substantially insensitive to the action of light. A further object of this invention is to provide masked or hindered organic polyisocyanates which have a low vapor pressure and which may be used for the preparation of polyurethane plastics which are substantially insensitive to the action of artificial light or sunlight.

The foregoing objects and others which will become apparent from the following description are accomplished in accordance with the invention, generally speaking, by providing di-(isocyanatomethyl) cyclobutane having the formula

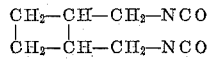

or derivatives thereof and reaction products thereof with organic compounds containing active hydrogen containing groups to form urethane which are substantially insensitive to the action of light. Therefore, this invention involves new organic polyisocyanates and their reaction products with active hydrogen containing compounds such as hydroxyl polyesters obtained from polycarboxylic acids and polyhydric alcohols, polyhydric polyalkylene ethers, polyhydric polythioethers and the like, as well as processes for the preparation of the organic polyisocyanates.

Insofar as this invention involves the organic polyisocyanates it relates to a monomer having the formula set forth above, as well as polymers thereof such as, for example, the reaction product of the di-(isocyanatomethyl) cyclobutane with water or a polyhydric alcohol or phenol to prepare derivatives which are capable of reacting like the monomer except that they have a lower vapor pressure and are consequently less toxic. The monomeric form of the di-(isocyanatomethyl) cyclobutane of the invention may be prepared by the phosgenation of di-(aminomethyl) cyclobutane or the hydrochloride as well as carbamic acid salts thereof. The most advantageous method of preparing the 1,2-di-(isocyanatomethyl)cyclobutane is to dimerize acrylonitrile according to the following equation to prepare 1,2-di-(cyano) cyclobutane and then hydrogenate and subsequently phosgenate the resulting product to form the monomeric di-(isocyanatomethyl) cyclobutane.

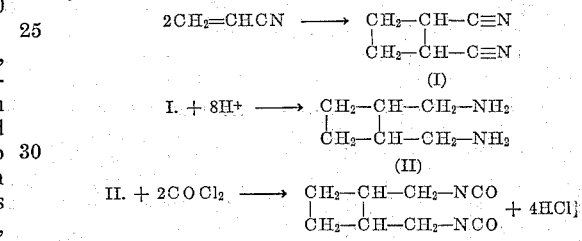

The invention also contemplates, as set forth above, the addition and polymerization products of the new diisocyanate with aliphatic, araliphatic and cycloaliphatic polyhydric alcohols, preferably in such molar ratios that one hydroxyl group is present for each two —NCO groups. Any suitable aliphatic polyhydric alcohol may be used such as, for example, ethylene glycol, propylene glycol, butylene glycol, amylene glycol, glycerine, trimethylol propane, pentaerythritol and the like. Any suitable araliphatic alcohol may be used such as, for example, xylylene glycol, p-(β-hydroxyethyl) benzene, 2,4,6-β-hydroxyethyl toluene and the like. Any suitable cycloaliphatic polyhydric alcohol may be used such as, for example, 1,4-cyclohexanol, 2,4,6-trihydroxy cyclohexane and the like. Furthermore, urea diisocyanates may be obtained by reacting the di-(isocyanatomethyl) cyclobutanes with water to prepare the corresponding urea diisocyanates. Alternately, the urea diisocyanates may be prepared by reacting the di-(isocyanatomethyl) cyclobutane compound with polyamines and preferably diamines such as, for example, N,N'-dimethyl ethylene diamine, N,N'-dimethyl-p-amino aniline and the like. Still further trimerization products, i.e. compounds containing isocyanuric acid rings may be prepared from the di-(isocyanatomethyl) cyclobutane compound in the presence of tertiary bases such as, N,N-dimethyl piperazine, triethylene diamine, N-methyl morpholine, endoethylene piperazine and the like, preferably at elevated temperatures and preferably in the presence of a small amount of a urethane such as, for example, N-phenyl carbamic acid methyl ester. Furthermore, biuret polyisocyanates may be prepared according to the process disclosed in copending application U.S. Serial No. 806,444, now Patent No. 3,124,605, by reaction of water or substances which contain the water of crystallization that will be released at elevated temperature with di-(isocyanatomethyl) cyclobutane or from the corresponding urea diisocyanates and an excess of di-(isocyanatomethyl) cyclobutane. The biuret polyisocyanates are preferably freed from monomeric di-(isocyanatomethyl) cyclobutane by vacuum distillation on a thin film evaporator. The biuret polyisocyanates are preferred for reaction with organic compounds containing active hydrogen containing groups as more particularly set forth below to prepare light-fast coatings and the like.

According to one embodiment of the invention the polyisocyanates set forth above are reacted with a monohydroxy compound to prepare a derivative which is capable of releasing isocyanate and then combining this product with an organic compound containing active hydrogen containing groups and subjecting the mixture to conditions which will cause the regeneration of the isocyanate grouping. Suitable monohydroxy compounds are, for example, phenols including phenol per se, cresol and the like. Where aliphatic monohydroxy compounds are used, it is preferred that they be linear and contain from one to ten carbon atoms including methanol, ethanol, propanol, butanol, pentanol, hexanol, heptanol, octanol, nonanol and decanol. However, they may be branched and the various positional isomers of these are contemplated. Of course, the cycloaliphatic compounds such as cyclohexanol and the like as well as araliphatic compounds such as benzyl alcohol may be used.

Any suitable organic compound containing at least two active hydrogen containing groups as determined by the Zerewitinoff method, said groups being reactive with an isocyanate group, may be reacted with the di-(isocyanatomethyl) cyclobutane or the above-defined reaction products thereof to produce polyurethane plastics. The active hydrogen atoms are usually attached to oxygen, nitrogen or sulphur atoms. Thus, suitable active hydrogen containing groups as determined by the Zerewitinoff method which are reactive with an isocyanate group include —OH, —NH$_2$, —NH—, COOH, —SH and the like groups. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. These compounds most preferably have hydroxyl numbers of from about 50 to about 350, the best results being obtained with those having an hydroxyl number from about 150 to about 250. A satisfactory upper limit for the molecular weight of the organic compound containing at least two active hydrogen containing groups is about 10,000 but this limitation is not critical so long as satisfactory mixing of the organic compound containing at least two active hydrogen containing groups with the di-(isocyanatomethyl) cyclobutane can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic aid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemilellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, Vol. 7 pp. 257–262, published by Interscience Publishers Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example alkane diols such as, for example, ethylene glycol, 1,3-propylene glycol, 1,2-propylene glycol, 1,4-butylene glycol 1,3-butylene glycol, 1,5-pentane diol, 1,4-butane diol, 1,3-pentane diol, 1,6-hexanediol, 1,7-heptane diol 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,4-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as, 1-hexene-1,3,6-triol and the like; alkyne triols such as, 2-hexyne-1,3,6-triol and the like; alkane tetrols such as, for example, 1,2,5,6-hexane tetrol and the like; alkene tetrols such as, for example 3-heptene-1,2,6,7-tetrol and the like; alkyne tetrols such as, for example, 4-octyne- 1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like.

Any suitable polyamine may be used including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino 5-aminomethyl pyrimidine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N'-tetrakis(2-hydroxy propyl)ethylene diamine, as well as compounds of any of the classes set forth above which are substituted with halogen such as, for example, chloro, iodo, bromo and the like; nitro; alkoxy, such as, for example methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphato and the like.

Also suitable are the oil modified alkyd resins, partially saponified copolymerization products containing vinyl acetate, epoxy resins which contain terminal hydroxyl groups and copolymers obtained by polymerization of low molecular weight olefins such as ethylene, propylene, butylene or any other olefine having the formula $C_nH_{2n}$ and preferably containing one to seven carbon atoms, and carbon monoxide at elevated pressure in which the keto groups have been wholly or partially transformed by reduction to secondary hydroxyl groups, as disclosed in Journal of American Chemical Society 74, 1509 (1952).

It is possible in accordance with the present invention and using the di-(isocyanatomethyl) cyclobutanes of the invention to prepare improved coatings, castings, moldings, cellular plastics, elastomers and the like by reaction of the said di-(isocyanatomethyl) cyclobutane with the foregoing oragnic compounds containing at least two active hydrogen containing groups as determined by the Zerewitinoff method in accordance with processes more particularly set forth below. Thus, high-grade elastomeric materials may be obtained by reacting the active hydrogen containing compounds with an excess of the diisocyanate and then mixing the resulting isocyanate-modified prepolymer with a cross-linking agent such as a polyhydric alcohol, a polyamine or water and curing the resulting mixture in a mold to prepare the elastomer either alone or together with additional polyisocyanate. It is preferred in this process to use difunctional organic compounds containing active hydrogen containing groups such as, for example, dihydroxy polyesters, dihydric polyethers, dihydric polythioethers and the like with from about 100 percent to about 900 percent excess, and preferably 100 percent to 250 percent excess diisocyanate above that calculated on a mol basis to react with all of the active hydrogen in the first component. An isocyanate-modified prepolymer results which may be then mixed with a polyhydric alcohol, polyamine, water or the like and cured in a mold to form polyurethane plastics which have improved resistance to the discoloration caused by light. As cross-linking agents, it is preferred to employ alkylene glycols and most preferably those having at least four carbon atoms. Suitable processes for the preparation of this type of product are disclosed in U.S. Patent 2,729,618. Suitable cross-linking agents are, for example, 1,4-butane diol, 1,3-butane diol, 2,3-butane diol, 1,5-pentane diol, di-β-hydroxyethyl hydroquinone, ethylene diamine, propylene diamine bis(hydroxyethyl)-m-toluidine and the like. Where water is used as the cross-linking agent, it is preferred to proceed via the so-called millable gum process which involves first preparing the isocyanate-modified prepolymer having terminal —NCO groups and then mixing the resulting product with water or other cross-linking agent as disclosed above in heavy-duty mixing equipment to prepare a waxy crumb which may then be sheeted out and compounded on a rubber roller with additional organic polyisocyanate which may be the same or different than that used initially and finally pressed into molds and allowed to cure to form an elastomeric polyurethane plastic. In accordance with a preferred embodiment of this invention elastomeric polyurethanes are prepared from the isocyanate-modified prepolymers set forth above which may be cured with either water or aliphatic diamines such as N,N'-dimethyl ethylene diamine, to obtain polyurethane plastics which are suitable for the production of foils, coatings and the like and which have excellent light-fastness.

Storable isocyanate-modified prepolymers may be prepared in accordance with the invention by the above-defined processes wherein an excess of the di-(isocyanatomethyl) cyclobutanes are reacted with the organic compounds containing at least two active hydrogen containing groups in a first step and then subsequently reacted with a diamine or glycol as set forth above to prepare the storable product. It is preferred to carry out the first step under substantially anhydrous conditions. Vulcanization of this storable product may be brought about at a later time by reaction thereof with additional organic polyisocyanate which may be the above-described di-(isocyanatomethyl) cyclobutane diisocyanates or any other suitable organic diisocyanate including those disclosed in U.S. Reissue Patent 24,514 and the above-mentioned Patent 2,729,618 or another cross-linking agent such as, for example, formaldehyde compounds containing N-methylol groups such as trimethylolmelamine, sulfur or organic peroxides such as benzoyl peroxide and the like. The preferred curing agents are the dimeric diisocyanates such as the dimer of 2,4-toluylene diisocyanate. A slight over-all excess of isocyanate is preferred in all of these processes.

Cellular polyurethane plastics may be prepared from the di-(isocyanatomethyl) cyclobutanes of the invention in accordance with the known processes for preparing foam plastics. Suitable processes for carrying out the foaming of the isocyanates are disclosed in U.S. Reissue Patent 24,514. Thus, it is possible to first prepare a prepolymer having terminal —NCO groups from an excess of the di-(isocyanatomethyl) cyclobutanes and then combine the resulting product with water in a second step or in the alternative it is possible to combine all of the separate components in a single step and allow the foaming reaction to proceed to form a cellular polyurethane plastic. It is not necessary that the reaction components contain water if some other type of blowing agent is included therein such as, for example, the tetrahalohydrocarbons such as trichlorofluoromethane, dichlorodifluoromethane and the like which are sensitive to temperature and will cause expansion of the reacting polymer to form a cellular polyurethane plastic. A wide range of different additives can be added to the reaction mixture in the production of the cellular polyurethane plastics. Thus, it is sometimes advantageous to use emulsifiers such as, for example, sulphonated castor oil and/or adducts of ethylene oxide with hydrophobic compounds containing one or more hydrogen atoms.

Best results are obtained if the reaction mixture to prepare the cellular polyurethane contains a silicone compound as a stabilizer. The foam stabilizer results in a foam having a smaller cell size than would be obtained with a comparable reaction mixture not containing the stabilizer. An alkyl siloxane oxyalkylene block copolymer is preferred as the stabilizer. A siloxane oxyalkylene block copolymer having the formula:

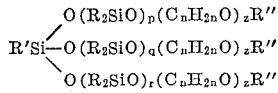

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34 or similar stabilizer gives best results so a process which uses this stabilizer is contemplated by the invention as a preferred embodiment. Compounds represented by the formula and a method for making them are disclosed in U.S. Patent 2,834,748. The concentration of the stabilizer can vary over a relatively wide range but preferably it will lie within the range of from about 0.01 to about 3 parts by weight per 100 parts resin. Most preferably, the amount of stabilizer is about from 0.5 to 1.0 part by weight per 100 parts resin.

Accelerator compounds will also aid in the production of regular cell size such as, for example, tertiary amines including dimethyl benzyl amine, 1-ethoxy-3-dimethyl amino propane, endoethylene piperazine, permethylated N-ethyl amino piperazine, dimethyl ethyl amine and the like as well as other known basic accelerators such as, for example, alkali metal hydroxides such as sodium hydroxide, alkali metal carbonates such as sodium carbonate, alkali metal phenolates such as sodium phenoxide, alkali metal alcoholates such as sodium methoxide, tin compounds such as dibutyl tin di-2-ethyl hexoate, dibutyl tin dilaurate, stannous octoate, stannous oleate and the like. Other additives include dyes, fillers, flameproofing agents, plasticizers, paraffin oils, silicone oils such as dimethyl siloxanes and the like.

A preferred field of application for the new di-(isocyanatomethyl) cyclobutanes of the invention is in the preparation of coating compositions and substrates coated therewith. Thus, the coating compositions based on the new polyisocyanates have extremely high fastness to light, high elasticity, and very durable resistance to chalking when exposed to weather as well as good resistance to hydrolytic degradation and chemical and solvent attack.

The coating compositions of the invention may be prepared by reacting the di-(isocyanatomethyl) cyclobutane compounds with preferably branched polyesters or polyethers as disclosed above. Preferred polyesters are, for example, adipic acid ethylene glycol trimethylolpropane polyesters and phthalic acid trimethylol propane polyesters as well as those based on isophthalic acid. The reaction may be carried out in solution and with the use of low molecular weight cross-linking agents as more particularly disclosed above. The preferred method of preparing a coating composition is to prepare a biuret polyisocyanate of the di-(isocyanatomethyl) cyclobutanes in accordance with the process of copending application U.S. Serial No. 806,444, now Patent No. 3,124,605. These biuret polyisocyanates preferably have the formula:

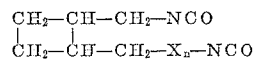

where $n$ is 1 to 6 and X is

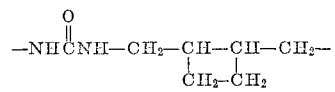

or

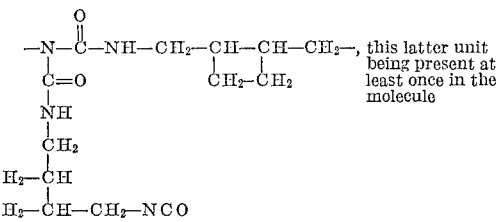

These isocyanates are thick liquid oils which have surprisingly high solubility in conventional lacquer solvents such as hydrocarbons, ethers and other nonpolar solvents such as, for example, benzene, toluene, xylene, petroleum ether, ethylacetate and the like. Addition compounds of the biuret polyisocyanates with a deficiency of compounds which contain more than one reactive hydrogen atom such as trimethylol propane and the like are also suitable for the production of light-fast lacquer coatings. Moreover, it is possible to react these polyisocyanates with a monohydric phenol to obtain a compound which is capable of generating an isocyanate on heating to an elevated temperature. The coating composition may be applied to any suitable substrate by brushing, spraying, pouring, wiping, dipping and the like. The curing of the coated substrate will take place at room temperature but it may be advantageous to heat the coated substrate to an elevated temperature in order to speed up the coating process. The proportions of polyisocyanate to active hydrogen containing compound is preferably stoichiometric so that sufficient polyisocyanate is present to react with all of the active hydrogen atoms. However, an excess of either component may be used. The preferred solvents for the coating compositions are ethylacetate, butylacetate, glycol monomethyl etheracetate, glycol monoethyl etheracetate as well as mixtures thereof and aromatic hydrocarbons such as toluene and/or xylene. Generally speaking, any suitable inert nonpolar organic solvent may be used. Lacquer compositions may be prepared which have high hardness, good elasticity, high resistance to abrasion, good resistance to solvents, acids, caustic solutions, salt solutions, sea water, hydrolytic degradation and the like. Thus, the coatings produced in accordance with the invention not only have high fastness to light but are of superior mechanical properties to those previously prepared from aliphatic polyisocyanates and active hydrogen containing compounds.

It is mentioned for purposes of identification that the diamine resulting from the catalytic hydrogenation of 1,2-di(cyano) cyclobutane (i.e. cyclobutane-1,2-dinitrile) obtained from the dimerization of acrylonitrile is a water white liquid having a boiling point of about 83° C. to about 85° C. at 14 mm. Hg. 1,2-di-(isocyanatomethyl) cyclobutane,

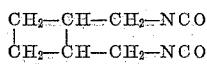

is a water white liquid having a boiling point of about 128° C. to about 131° C. at 13 to 14 mm. Hg.

The products of the invention may be used for the production of gear wheels, accumulation bladders, thermal and sound insulation as well as coatings for refrigerators, kitchen equipment, furniture, parquet floors and the like.

The invention is further illustrated by the following examples in which parts by are by weight unless otherwise specified.

EXAMPLE 1

About 200 parts of an adipic acid-ethylene glycol polyester (OH number 58; acid number 1.1) and about 15 parts of bis-(hydroxyethyl)-m-toluidine are dehydrated for about half an hour at about 130° C./14 mm. The temperature of the melt is then allowed to fall to about 90° C. and about 30.6 parts of 1,2-di-(isocyanatomethyl) cyclobutane and about 0.2 part of dibutyl-tin-dilaurate are added. The temperature is kept at about 100° C. for about 90 minutes while stirring well and the viscous melt is poured onto a support. After continued heating for 24 hours, a storable polyurethane rubber with terminal hydroxyl groups is obtained, which rubber can be rolled on rubber mixing rollers into a smooth sheet and can be cross-linked at temperature of about 120° C. with formaldehyde, dimethylol urea or polyisocyanate such as diphenyl methane-4,4'-diisocyanate to form an elastic polyurethane plastic.

EXAMPLE 2

The procedure followed is as in Example 1, but using about 180 parts of the polyester mentioned in Example 4. About 22.2 parts of 1,2-di-(isocyanatomethyl) cyclobutane are incorporated by stirring at about 90° C. The temperature is kept at about 90° C., allowed to fall after about one hour to about 70° C. and about 6.6 parts of 4,4'-diaminodiphenyl methane, dissolved in about 20 parts of the polyester of Example 1, are incorporated by stirring. After about 10 minutes, the mixture is poured onto a support and heated for approximately another 24 hours. A storable polyurethane rubber with terminal amino groups is obtained, which rubber is transformed at about 120° C. to about 140° C. with formaldehyde or polyisocyanates such as di-N,N'-3-(carbimido-4-methyl-phenyl) urea into a cross-linked polyurethane plastic of high molecular weight.

EXAMPLE 3

About 200 parts of adipic acid-ethylene glycol polyester (OH number 59; acid number 0.8) and about 15 parts of bis-(hydroxyethyl)-m-toluidine are dehydrated for about half an hour at about 130° C./14 mm. After cooling the melt to about 90° C., about 27.6 parts of 1,2-di-(isocyanatomethyl) cyclobutane and about 7.6 parts of an addition product of about 1 mol of trimethylol propane and about 3 mols of 1,2-di-(isocyanatomethyl) cyclobutane are incorporated by stirring into the melt. The temperature is maintained for about 30 minutes at about 100° C. and then the mixture is poured onto a support. After heating for approximately another 24 hours, a soft sheet which can be rolled on rubber mixing rollers is obtained, and this sheet can be cross-linked while shaping with formaldehyde or diphenylmethane-4,4'-diisocyanate in accordance with Examples 1 and 2.

EXAMPLE 4

About 100 parts of a polyester of about 3 mols of phthalic acid and about 4 mols of trimethylol propane (10.1% OH) are processed with about 100 parts of a mixture of equal parts of toluene, ethyl acetate, butyl acetate and glycol monomethyl ether acetate as well as about 106.5 parts of titanium dioxide (rutile) to form a paste. Approximately 179 parts of additional solvent mixture and about 2 parts of polyvinyl methyl ether are added to the said paste. About 151 parts of 75% solution in ethyl acetate of a biuret polyisocyanate of 1,2-di-(isocyanatomethyl) cyclobutane, obtained from 3 mols of 1,2-di-(isocyanatomethyl) cyclobutane with 1 mol of water according to the procedure of copending application Serial Number 806,444 are then incorporated into the mixture. The hydroxyl groups of the polyester are then stoichiometrically reacted with the isocyanate groups. The lacquer formed has a pendulum hardness (according to König) of about 180 and an Erichsen depression of about 5.8 mm. The complete and thorough drying is obtained after about 12 hours. After about 24 hours, the lacquer is resistant to solvents such as, for example, toluene and does not show any yellowing in artificial and natural light.

EXAMPLE 5

About 100 parts of a polyester (10.0% OH), prepared from about 1.5 mols of isophthalic acid, about 4 mols of trimethylol propane and about 1.5 mols of adipic acid are processed with about 100 parts of the solvent mixture of Example 4 and about 106.5 parts of titanium dioxide (rutile) to form a paste. This paste has added thereto approximately another 179 parts of the solvent mixture and about 2.1 parts of polyvinyl methyl ether. About 151 parts of a 75% solution in ethyl acetate of the biuret polyisocyanate according to Example 4 are then added to the mixture; the hydroxyl groups are then stoichiometrically crosslinked with isocyanate groups. The resulting lacquer shows no yellowing in artificial and natural light, has a pendulum hardness of about 170 and is resistant to solvents, such as, for example, toluene, after about 24 hours.

Prepartion of 1,2-di-(isocyanatomethyl)-cyclobutane (a) Cyclobutane-1,2-dinitrile is prepared according to the description disclosed in German Patent 1,081,008 of February 6, 1959 and by E. C. Coymer and W. S. Hillman, in American Soc. 71,324, 1924.

(b) Production of 1,2-bis-aminomethyl-cyclobutane: 200 cc. of tetrahydrofurane, 200 cc. of liquid ammonia, 20 grams of Raney-nickel and 20 grams of calcium oxide are placed in a high-pressure autoclave of a capacity of about 1.4 litres. Hydrogen is passed in up to a pressure of 150 atmospheres and the autoclave is heated to 90° C. The stirrer mechanism is started and a solution of 150 grams of 1,2-cyano-cyclobutane in 200 cc. of tetrahydrofurane is slowly pumped in at the rate at which the dinitrile is hydrogenated, i.e. in such a manner that any consumption of hydrogen can no longer be determined after stopping the pumping action. Depending on the quality of the dinitrile the introduction thereof requires 2-3 hours. In accordance with the consumption rate the hydrogen is replenished in such a manner that a pressure between 100 and 150 atm. is maintained. The temperature is raised up to 120°. Finally, the pump and delivery pipes are rinsed with about 70 cc. of tetrahydrofurane, and the mixture is hydrogenated at 120° and 150 atm. for another hour whereupon an appreciable absorption of hydrogen is no longer observed. The mixture is allowed to cool, the pressure released and the mixture filtered. The filtrate is heated at a reflux condenser until the major quantity of ammonia is evaporated and the solvent is then separated off by fractionating at atmospheric pressure. After fractionating the residue at subatmospheric pressure there are obtained, after a small amount of first runnings, 110–125 grams of bis-aminomethyl-cyclobutane (B.P. 89–91° C./20 mm. Hg) in a purity of 97–99%. The yield corresponds to 68–78% of the theoretical.

(c) 600 parts by weight of phosgene are dissolved in 1500 parts by volume of chlorobenzene, and a soltuion of 114 parts by weight of 1,2-bis-aminomethyl-cyclobutane in 500 parts by volume of chlorobenzene is added dropwise at 0 to —5° C. within about 2 hours. The suspension obtained is slowly heated up. Phosgene is introduced, beginning at 50° C. While passing in further amounts of phosgene, the suspension is heated to 90° C. within 3-4 hours. Treatment with phosgene is continued in an obturator head at about 120° until the solution has become clear. Excess phosgene is removed by passing nitrogen through the solution which is then fractionated. After removing the chlorobenzene the resulting oily residue is distilled in vacuum. 124.5 parts by weight of 1,2-di-(isocyanatomethyl)-cyclobutane of the boiling point 128–131° C./13–14 mm. Hg are obtained. Yield: 75 percent of the theoretical.

It is to be understood that the foregoing examples are only illustrative and that other reactants could have been used therein in accordance with the preceding disclosure with satisfactory results.

Although the invention has been described in considerable detail in the foregoing, it is to be understood that such detail is solely for the purpose of illustration and that many variations can be made by those skilled in the art without departing from the spirit and scope of the invention except as set forth in the claim.

What is claimed is:

1,2-di-(isocyanatomethyl) cyclobutane.

References Cited by the Examiner
UNITED STATES PATENTS

| | | | |
|---|---|---|---|
| 2,764,565 | 9/1956 | Hoppe et al. | 260—2.5 |
| 2,865,940 | 12/1958 | Nobis et al. | |
| 2,957,832 | 10/1960 | Gmitter et al. | 260—2.5 |
| 2,963,504 | 12/1960 | Thelis et al. | 260—453 |
| 2,978,476 | 4/1961 | Klager et al. | 260—453 |

OTHER REFERENCES

Arnold et al.: Chem. Revs. 57, page 48 (1957).

The Chemistry of Acrylonitrile 2nd Ed., page 14.

CHARLES B. PARKER, Primary Examiner.

DANIEL ARNOLD, LEON ZITVER, IRVING MARCUS, Examiners.